United States Patent
Bailey et al.

(10) Patent No.: US 8,230,983 B2
(45) Date of Patent: Jul. 31, 2012

(54) ELECTRICALLY ACTUATED AIRCRAFT BRAKES

(75) Inventors: David Alexander Bailey, Coventry (GB); Jonathan Deric Lumb, Coventry (GB); Andrew Whittingham, Coventry (GB)

(73) Assignee: Meggitt Aerospace Limited (GB)

( * ) Notice: Subject to any disclaimer, the term of this patent is extended or adjusted under 35 U.S.C. 154(b) by 512 days.

(21) Appl. No.: 11/577,767

(22) PCT Filed: Jan. 9, 2006

(86) PCT No.: PCT/GB2006/000053
§ 371 (c)(1),
(2), (4) Date: Apr. 23, 2007

(87) PCT Pub. No.: WO2006/085047
PCT Pub. Date: Aug. 17, 2006

(65) Prior Publication Data
US 2009/0114488 A1    May 7, 2009

(30) Foreign Application Priority Data
Jan. 8, 2005   (GB) .................................. 0500305.8

(51) Int. Cl.
*F16D 55/36* (2006.01)

(52) U.S. Cl. ................ 188/1.11 L; 188/1.11 E

(58) Field of Classification Search .............. 188/1.11 E, 188/1.11 L; 340/454; 116/208
See application file for complete search history.

(56) References Cited

U.S. PATENT DOCUMENTS

| | | | |
|---|---|---|---|
| 5,825,287 A * | 10/1998 | Zarybnicky et al. | 340/453 |
| 5,939,978 A * | 8/1999 | Kyrtsos | 340/454 |
| 6,003,640 A | 12/1999 | Ralea | |
| 6,238,011 B1* | 5/2001 | Heckmann | 303/20 |
| 6,581,728 B2* | 6/2003 | Borugian | 188/1.11 E |
| 6,959,794 B2* | 11/2005 | Ralea et al. | 188/156 |
| 7,011,186 B2* | 3/2006 | Frentz et al. | 188/1.11 L |
| 7,108,107 B2* | 9/2006 | Ralea et al. | 188/1.11 L |
| 7,445,091 B2* | 11/2008 | Kawahara et al. | 188/1.11 L |
| 2004/0084252 A1 | 5/2004 | Devlieg | |
| 2004/0245053 A1 | 12/2004 | Chico et al. | |
| 2009/0084637 A1* | 4/2009 | Bailey et al. | 188/1.11 E |

OTHER PUBLICATIONS

International Search Report.

* cited by examiner

*Primary Examiner* — Christopher Schwartz
(74) *Attorney, Agent, or Firm* — Renner, Kenner, Greive, Bobak, Taylor & Weber

(57) ABSTRACT

An electrically actuated aircraft brake with a carbon-carbon composite heat pack and an electrical actuator for engaging the heat pack and operating the brake. When the brake is not being applied, the brake actuator is adjusted in dependence upon temperature, for example, by controlling the actuator to maintain a temperature regulated position.

5 Claims, 4 Drawing Sheets

ELECTRICALLY ACTUATED AIRCRAFT BRAKES

BACKROUND OF THE INVENTION

This invention relates to electrically actuated aircraft brakes, and is more particularly but not exclusively concerned with running clearance adjustment of such brakes.

Wear at taxi speed in carbon-carbon (C—C) brake friction material discs that comprise an aircraft brake heat stack is significant and disproportionate to the low energies involved. It is, therefore, important to control running clearance adjustment of brakes to avoid drag between discs in the brake heat stack that can result in excessive wear of disc friction surfaces if running clearance has been taken up by thermal expansion. However, if running clearance is too wide this can result in lag between the application of the brake and the braking action, potentially endangering the safety of the aircraft.

Aircraft brakes have in the past typically featured hydraulically actuated rams (pistons) to generate the clamping force across the brake heat pack to generate friction at the disc interfaces. The actuator rams are backed-off from contact with the brake heat stack by a predetermined distance by means of a mechanical system using springs when the hydraulic pressure is released from the braking system after the brake demand is removed.

As technology is introduced for the more electric aircraft there is an emerging trend towards using electrically powered actuator rams for aircraft brakes. In such actuators the movement to apply and release the brake clamping force in the actuator ram is driven by an electric motor through a mechanism such as gears or ball screws. To set the running clearance when the braking demand is removed requires the actuator motor to drive the actuator ram away from contact with the heat stack. This is done in U.S. Pat. No. 6,003,640 in the name of Goodrich by the use of position sensors coupled to the actuator ram to determine actuator ram position and driving the actuator ram back by a predetermined amount from the position of contact derived during the calibration routine.

In electrically actuated brakes such as described in U.S. Pat. No. 6,003,340 the system senses and records the position of the closed brake heat stack in an actuator position and wear calibration cycle at start up and calculates a running clearance position by backing the actuators a predetermined distance from that measured and recorded heat stack position. The distance is determined by the maximum possible thermal axial expansion of the C—C heat stack, to guarantee that in all operating conditions a dragging brake will not occur. On larger aircraft brakes this process leads to a relatively large running clearance being used, of the order of 3.5-4 mm, which in turn leads to a lag between brake application and generation of brake torque as the ram must cross the running clearance.

By backing the actuator ram away from contact with the closed position of the brake heat stack by a predetermined amount as known in hydraulic brakes and electrically actuated brakes such as are described in U.S. Pat. No. 6,003,640 there is no compensation for thermal expansion and contraction that will occurred in the brake heat pack during service cycles.

Expansion of the C—C brake heat stack is typically in the order of $12 \times 10^{-6}$ °C.$^{-1}$. This is equivalent to 1.2 mm per 1000° C. per 100 mm of heat stack thickness. For a typical medium size civil aircraft carbon-carbon brake heat stack with total thickness of 200 mm this gives an expansion of 2.4 mm between ambient and 1000° C. For a typical civil aircraft carbon-carbon brake heat stack with total thickness of 300 mm this gives an expansion of 3.6 mm between ambient and 1000° C.

Thermal expansion of a brake friction material with a positive expansion coefficient will be a positive value when the brake heat stack is increasing in temperature and a negative value when the brake heat stack is cooling.

When the brake heats during a braking cycle the heat stack will expand. When the braking demand is removed the brake control system will reverse the actuator ram to the predetermined running clearance position. If the temperature rise is significant, such as during a landing cycle, there is a risk that the expansion will reduce the gap between the expanded heat stack and the running clearance set position to the extent that the brake will drag and cause wear to the C—C brake discs and uncommanded braking.

If the brake running clearance is set when the brake heat stack is at an elevated temperature then, when the heat stack then cools below the temperature at which the running clearance is set, the brake heat stack will contract due to the cooling, thereby increasing the running clearance and at the next actuation of the brake there will be a delay while the additional running clearance between the actuator ram and brake heat stack is taken up.

In order to optimize brake performance it is important to reduce the response time to apply braking action after the brake control system identifies a braking demand at the pilot brake pedal. A running clearance in the order of 0.5 mm would be ideal for brake response, however, actual running clearance of brakes is set to gaps typically in the order of 3.5 mm to 4 mm on larger aircraft to allow for thermal expansion of the brake heat stack during service cycles.

There is a significant benefit to the wear of carbon-carbon brake heat stack discs and brake performance if running clearance can be adjusted to compensate for expansion effects in brake heat pack due to brake temperature to avoid dragging brakes and brake actuation lag.

According to one aspect of the invention, there is provided a method of operating an electrically actuated brake comprising a heat pack with carbon friction discs and an electrical actuator with a movable member for engaging the heat pack and operating the brake, the method comprising, whilst the brake is not applied, controlling the actuator to maintain the position of the movable member in dependence upon temperature.

Preferably, the method comprises controlling the actuator to maintain the relative position of the movable member and the heat pack in dependence upon temperature.

SUMMARY OF THE INVENTION

According to a second aspect of the invention, there is provided a method for operating an electrically actuated aircraft brake comprising a heat pack with carbon friction discs and an electrical actuator with a ram movable, from an adjustable initial position, into engagement with the heat pack so as to apply the brake, said method including:
  recording data indicative of the change in thickness of said heat pack with temperature;
  measuring the temperature of the heat pack; and
  adjusting said initial position of the actuator in dependence upon said data and the measured temperature.

According to a third aspect of the invention, there is provided an electrically actuated aircraft brake comprising:
  a heat pack having carbon friction discs;
  an electrical actuator having a movable member for engaging the heat pack and operating the brake; and control means for causing the actuator, whilst the brake is not applied, to maintain the position of the movable member, or said position relative to the heat pack, in dependence upon temperature.

According to a fourth aspect of the invention, there is provided an electrically actuated aircraft brake comprising:
a heat pack with carbon friction discs;
a an electrical actuator with a ram movable, from an adjustable initial position, into engagement with the heat pack so as to apply the brake;
means for making available recorded data indicative of the change in thickness of said heat pack with temperature;
means for measuring the temperature of said heat pack; and
means for adjusting said initial position of the actuator in dependence upon said data and the measured temperature.

Further aspects of the invention include particular individual features and combinations of features, mechanisms and apparatus disclosed in the following particular description and drawings, whether or not those features, mechanisms and apparatus relate to aircraft brakes, temperature or temperature variation, and whether or not contained within the scope of any of the first, second, third and fourth aspects disclosed above. The invention may include features such as adjusting the running clearance of a brake to compensate for changes in temperature to optimize brake clearance for improved brake performance without brake drag or uncommanded braking. Similarly, the invention may include features such as compensating for temperature changes in the brake heat stack to reduce wear in C—C brake discs caused by variation in brake running clearance due to thermal expansion of C—C discs.

Similarly, the invention may include features such as compensating for temperature changes in the brake heat stack to minimize lag in brake actuation caused by variation in brake running clearance due to thermal expansion of C—C discs.

The invention may include calculating heat stack position/thickness and running clearance position during operation to compensate for temperature changes caused by brake actuation.

In the following description, which is given by way of example, the point of contact when the actuator ram touches the closed brake heat stack (the point at which braking effect starts) will change during a braking event as the heat stack temperature rises and between braking events as the heat stack cools. In order to maintain the optimum running clearance the brake control system models the change of heat stack thickness with temperature so it knows the actuator position when brake is released and can then back off by a predetermined amount following a braking event to set the required running clearance or move forward between braking events to maintain the running clearance at the required distance.

The running clearance position can then be set at any temperature of the heat pack. The brake control unit can track the actual temperature of the heat pack or calculate heat pack temperature from heat pack mass and energy inputs and then use algorithms to determine the change in thickness of the brake heat stack during cooling or heating of the brake heat stack and the actual position of the end of the brake heat stack where the actuator rams act to apply load and signal the brake actuator to adjust the actuator ram position for the required running clearance. This operation can be carried out throughout aircraft service cycles from deployment of gear through the landing cycle and ground maneuvers to compensate for changes in heat pack thickness due to thermal expansion effects during braking events. Such compensation for temperature changes in the brake heat stack maintains the required running clearance to optimize brake performance and minimize brake drag.

By monitoring the heat stack wear during the life of a brake the thermal expansion will be calculated based on actual heat stack thickness to allow for changes in heat stack thickness, i.e. expansion calculated for heat stack of discs approaching the fully worn condition will be less than that for a new heat stack of discs. For a brake heat stack with a total of 60 mm wear this will make a difference of 0.72 mm over 1000 C of temperature change if the thermal expansion coefficient of the friction discs is $12 \times 10^{-6}$ $°C.^{-1}$. In addition, heat stack wear will have an effect of increasing the heat stack temperature as there is less mass to absorb the energy.

Heat pack wear can be used to determine the thickness of the brake heat stack. From heat stack thickness and temperature rise during a brake actuation the heat pack expansion can be calculated to allow a new running clearance position to be calculated following a braking event. As the brake then cools, the axial length of the heat stack will decrease. The piston position can be adjusted to avoid a lag that might be detrimental to brake performance.

Adjustments to running clearance position of the actuator ram can be made continuously for constant changing compensation or in a number of discrete stages around predefined temperature steps such as, for example 10° C., 50° C. or 100° C. steps. Alternatively, a combination of continuous and stepwise compensation can be used, for example, the adjustment as temperature increases will be continuously compensated and adjustments during cooling cycles would be at increments of, for example 50° C.

The invention is particularly applicable to aircraft braking systems utilizing electrical actuation to apply the brake clamping load. Such brakes are known and typically comprise a multi disc brake heat stack and a servo-mechanism for application of brake pressure. The multi disc heat stack comprises:
Carbon-carbon composite (C—C) stator discs keyed to the torque tube fixedly mounted to a brake plate and mounted axially about an axle; and
C—C Rotor discs interleaved between the stator discs and keyed to the inside of a wheel that is rotatably mounted by bearing means to the axle.

The servo mechanism consists of:
A plurality of electric actuator modules fixedly mounted around a brake plate, each actuator comprising a motor driving, through a gear box mechanism, a ballscrew to produce linear motion in an actuator ram applying and withdrawing load to the brake heat stack.
Position sensor to provide a signal representative of actuator position. The position sensor could be of a type connected to the actuator rams, however the sensor is preferably a resolver mounted so as to sense movement of the motor shaft. Position of the actuator ram is processed by the ECU through algorithms from the motor shaft rotation signal from the resolver and gear ratios through the gearbox and ball screw mechanism to deduce the actuator movement and position from a reference point. The resolver also provides information on motor speed to enable control of the rate of actuator ram movement.
Current sensor to detect motor current, this being representative of the load applied to the brake or, alternatively, a pressure load cell positioned within the brake to give a signal directly representative of brake load.
Electronic Control Unit (ECU) capable of providing current to the motor for moving the actuator into and out of forceful engagement and controlling the position of the actuator relative to the feedback signal from the position sensor.

Additional sensors are fitted as required for monitoring parameters such as temperature, wheel speed and brake torque.

At ambient temperature the size of the heat stack is known following a calibration routine. The calibration routine can be carried out in a number of ways, however a preferred method would involve driving the actuator ram forward until the heat pack is closed. This condition is detected by an increase in the motor current above a predetermined value. The actuator ram position and hence the position for the back actuator contact face of the heat stack is then known from the information provided by the position sensor and processed by the electronic control unit (ECU). The position of the heat stack actuator contact face can also be compared against one or more of the following known reference positions to give further information:

the opposite end face of the heat stack to give heat stack length;

the position of the actuator contact face for a predetermined minimum heat stack thickness to give remaining brake material thickness and remaining brake life;

the position of the actuator contact face when the heat stack was new to give the amount of brake wear.

By measuring the position for all actuators in a brake assembly when the brake is closed a mean value of the position and heat stack mass can be calculated by the control ECU.

From the measured and recorded actuator contact face position the running clearance can be set very accurately to 0.5 mm, or any other predetermined clearance. When a braking event subsequently occurs the actuator will move across the running clearance to enter forceful engagement with the heat stack to generate the braking force.

As the brake generates torque, the aircrafts kinetic energy will be converted, through friction into heat energy in the C—C brake heat stack.

The energy absorbed will be the product of the torque and wheel speed. Using this information, and following the procedure shown in the flow chart of FIG. 3, the temperature and predicted expansion of the C—C brake heat stack can be calculated. Following the braking event the actuator will be backed off to a position equal to running clearance plus the thermal expansion.

The thermal expansion will decay with time as the brake cools, this can be estimated by an algorithm or by comparison to sensor measurements taken from the brake. Readjustment of running clearance can be made on a continuous basis or, alternatively, on an incremental basis after predetermined temperature intervals, for example every 100° C. are passed through. On occasions when the brake is cooled to ambient, such as between service cycles or during maintenance periods, a new calibration cycle can be carried out to verify the actual actuator position at contact with the closed brake heat stack.

BRIEF DESCIPTION OF SEVERAL VIEWS OF THE DRAWINGS

In order that the invention may be well understood it will now be described by way of example only with reference to the accompanying diagrammatic drawings in which.

DETAILED DESCRIPTION OF THE PREFERRED EMBODIMENTS

Figure 1:
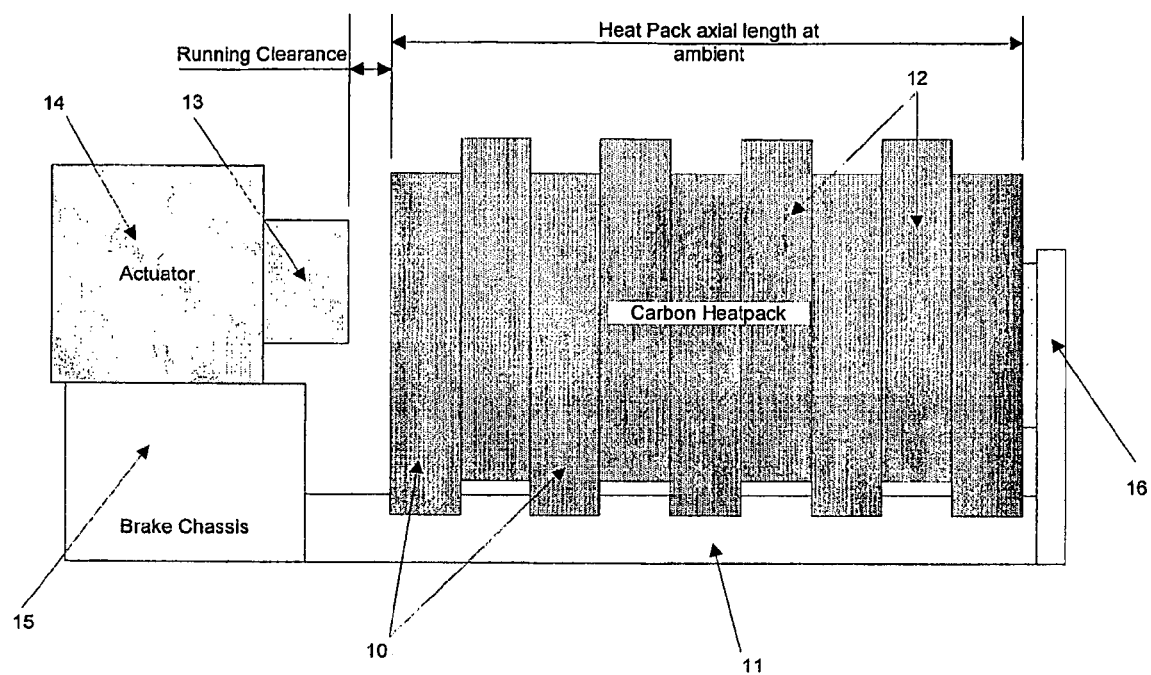
FIG. 1 shows the running clearance for a fully closed heat stack at ambient temperature.

FIG. 1 represents a section of a brake assembly showing a brake heat stack comprising carbon-carbon composite (C—C) stator discs 10 keyed to a torque tube 11 axially mounted about a wheel axle (not shown). Interleaved between the stator discs are C—C rotor discs 12 keyed to the inside of a wheel (not shown) for rotation with the wheel. The stator and rotor discs-in the brake heat stack are brought into frictional engagement by the application of the braking load by the actuator ram 13 that is driven by a motor through a gear and ball screw mechanism housed within the actuator module body 14. A plurality of actuator modules is mounted around a brake plate 15 to which the torque tube is attached. The brake plate is non-rotatably mounted to the aircraft landing gear (not shown). A reaction member 16 is provided at the opposite end of the torque tube from the actuator modules to oppose the braking force applied by the actuators.

The position of the actuator ram is determined by an Electronic Control Unit (ECU) processing a signal from a resolver mounted on the motor shaft to monitor rotation of the motor.

To set the running clearance, the ECU drives the actuator rams forward to contact and close the brake heat stack. The point at which the heat stack is just closed is detected by a load transducer or by the motor current rising above a predetermined value, the position of the actuator ram at the point when the heat stack is determined to be just closed is known by the ECU from the resolver signal that is representative of the actuator ram position. The actuator ram position for the point at which the heat stack is just closed is stored for reference and the running clearance is set by backing the actuator ram away form that point by a predetermined amount, for example 0.5 mm.

Figure 2:
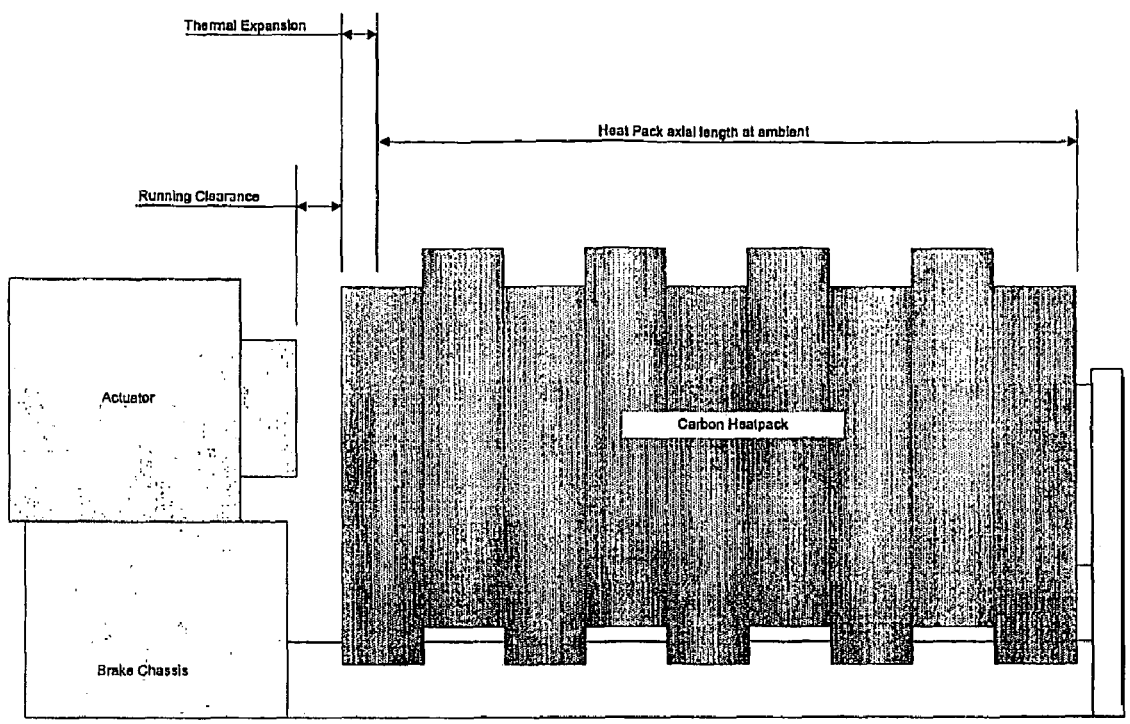
FIG. 2 shows the running clearance for the same heat stack at elevated temperature following a braking event actuation with the actuator backed off by the running clearance plus the calculated thermal expansion.

FIG. 2 represents a section through the brake assembly of FIG. 1 when the brake heat stack of C—C rotor discs and C—C stator discs is at an elevated temperature following a braking event. The expansion of the C—C material in the axial direction causes an increase in the length of the brake heat stack as shown by the thermal expansion.

Figure 3:
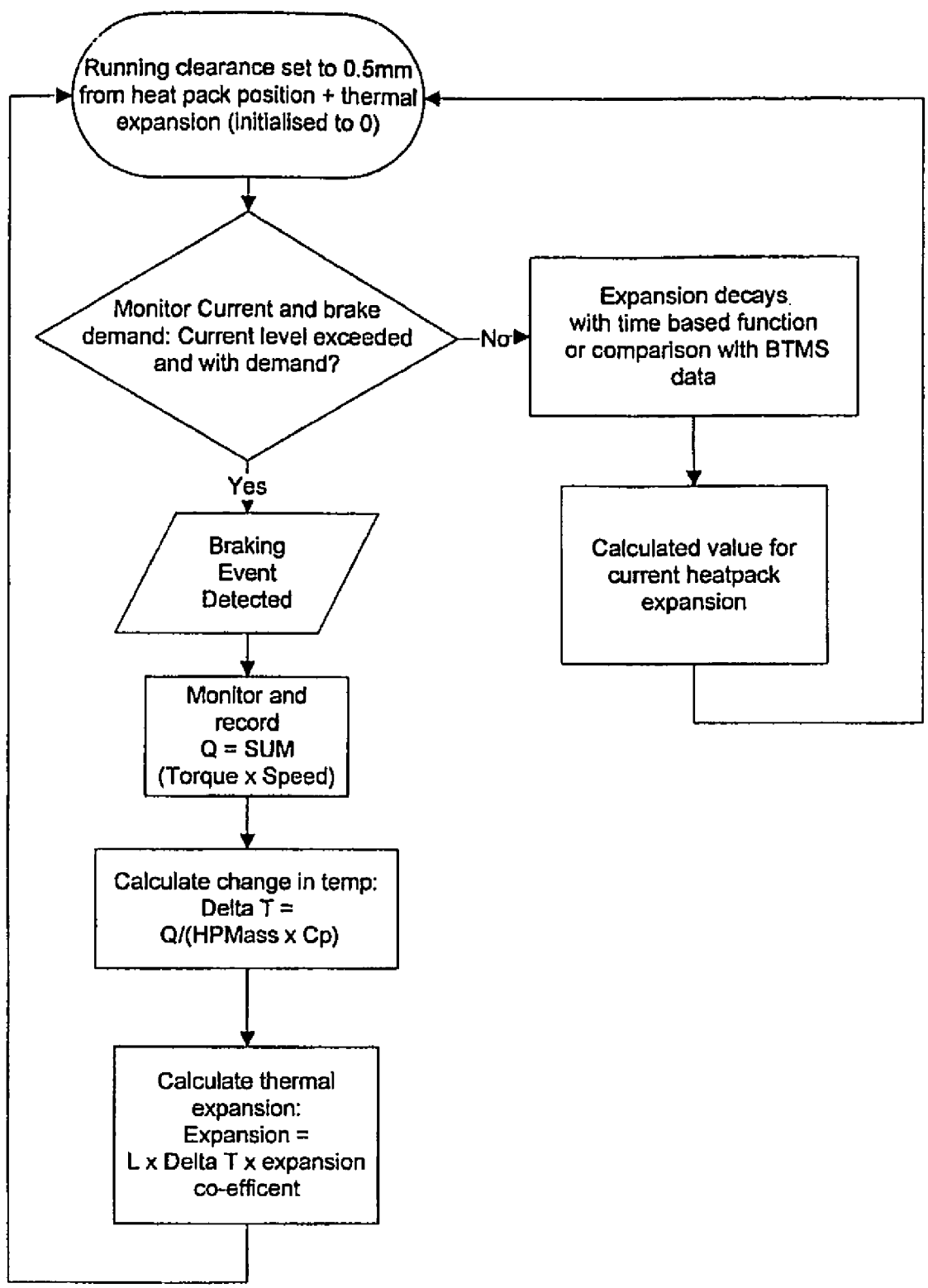
FIGS. 3 and 4 are respective flow charts relating to the method.

FIG. 3 shows a flow chart by which the ECU determines the new running clearance position of the actuator rams to take account of the brake heat stack thermal expansion. The ECU monitors the brake torque and wheel speed during the braking event to calculate the energy input to the brake. The length of the heat stack at ambient temperature is known by the ECU from the actuator position for a fully closed heat stack and a reference value such as the position of the reaction face of the brake heat stack or the position of the actuator rams when a new heat stack of known length is fitted to the brake. From this heat stack length information the ECU can determine heat stack mass and, by calculation using the specific heat and heat stack mass, the change in temperature of the heat stack. This temperature rise can then be used to determine the thermal expansion from the change in temperature, heat stack length at ambient temperature and coefficient of thermal expansion. The value for the thermal expansion can then be used by the ECU to determine the new running clearance position.

The thermal expansion will decay with time as the brake cools, this can be estimated by an algorithm or by comparison to sensor measurements taken from the brake. Readjustment of running clearance can be made on a continuous basis or, alternatively, on an incremental basis after predetermined temperature intervals, for example every 100° C. are passed through.

On occasions when the brake is cooled to ambient, such as between service cycles or during maintenance periods, a new calibration cycle can be carried out to verify the actual actuator position at contact with the closed brake heat stack.

Figure 4:
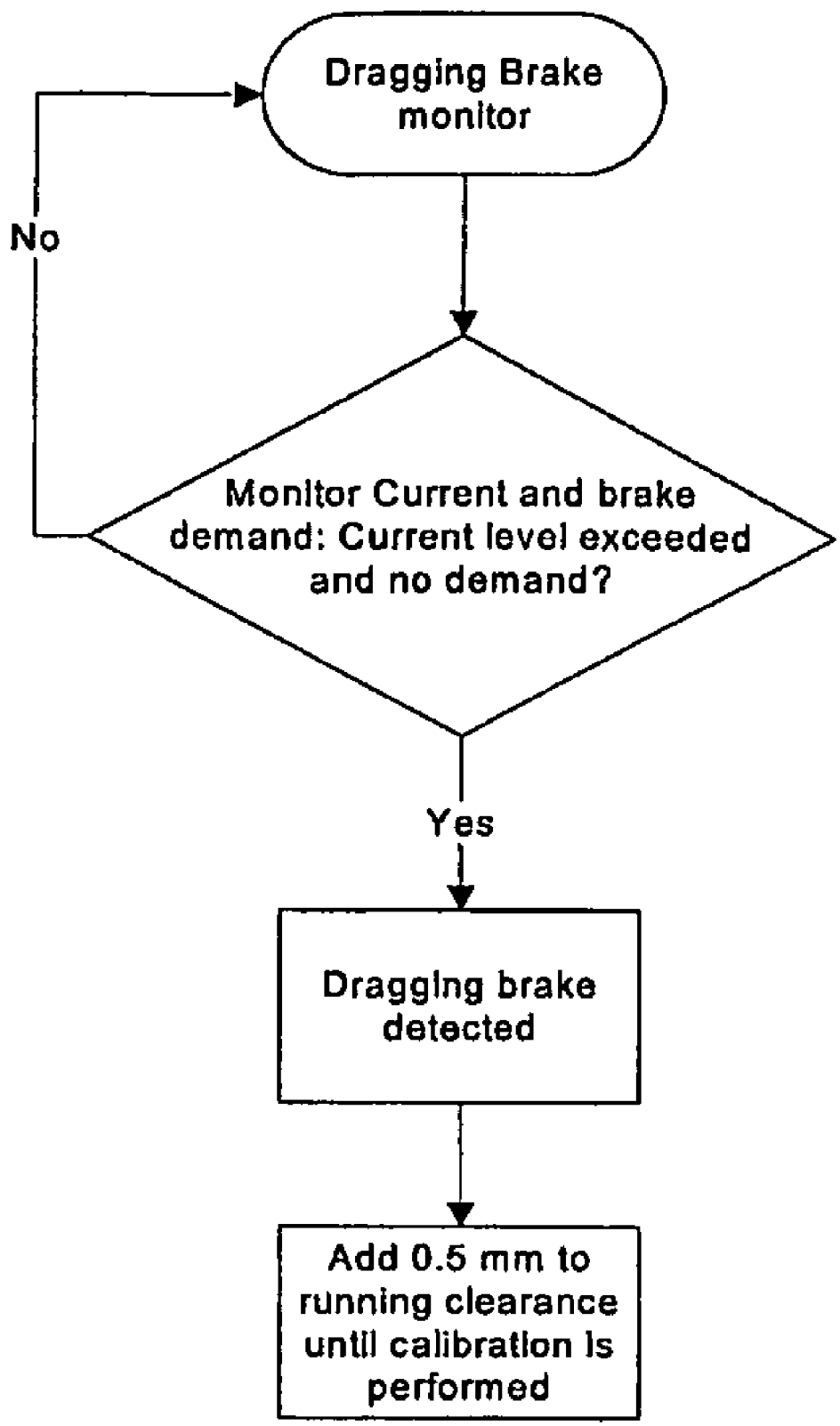

As a back-up to the calculated running clearance position to ensure that the brake is not dragging a further check routine is proposed in the flow chart of FIG. 4. Where a dragging brake occurs due to contact of the actuator ram against the brake heat stack a current will be generated in the actuator module motor due to the heat stack pressing against the actuator ram. Where a current is detected in the absence of a brake demand the system will recognize a dragging brake and make an appropriate adjustment to the running clearance by moving the actuator ram away form the brake heat stack by a predetermined amount, for example 0.5 mm.

Without further elaboration of the foregoing will so fully illustrate our invention that Others may, by applying current or future knowledge, adapt the same for use under various Conditions of service.

The invention claimed is:

1. A method of operating an electrically actuated brake comprising a heat pack with carbon friction discs and an electrical actuator with a movable member for engaging the heat pack and operating the brake, the method comprising a routine for maintaining a running clearance between the movable member and the heat pack when the brake is not applied, the routine for operation during taxiing and between braking operations and comprising, without applying the brake, controlling the actuator to maintain the position of the movable member relative to the heat pack in dependence upon temperature.

2. A method for operating an electrically actuated aircraft brake comprising a heat pack with carbon friction discs and an electrical actuator with a ram movable, from an adjustable initial position, into engagement with the heat pack so as to apply the brake, said method comprising a routine for maintaining a running clearance between the movable member and the heat pack when the brake is not applied, the routine for operation during taxiing and between braking operations and including, without applying the brake:
  recording data indicative of the change in thickness of said heat pack with temperature;
  measuring the temperature of the heat pack; and
  adjusting said initial position of the actuator in dependence upon said data and the measured temperature.

3. An electrically actuated aircraft brake comprising:
  a heat pack having carbon friction discs;
  an electrical actuator having a movable member for engaging the heat pack and operating the brake; and
  control means for controlling a running clearance maintenance routine during taxiing and between braking operations, said routine causing the actuator, without applying the brake, to maintain the position of the movable member, or said position relative to the heat pack, in dependence upon temperature.

4. An electrically actuated aircraft brake comprising:
  a heat pack with carbon friction discs;
  an electrical actuator with a ram movable, from an adjustable initial position, into engagement with the heat pack so as to apply the brake;
  electronic control unit for controlling a running clearance maintenance routine for operation during taxiing and between braking operations and, the routine not including application of the brake, said electronic control unit being operably connected to:
   i. means for making available recorded data indicative of the change in thickness of said heat pack with temperature;
   ii. means for measuring the temperature of said heat pack; and
   iii. means for adjusting said initial position of the actuator in dependence upon said data and the measured temperature and without applying the brake.

5. A method of performing a routine for maintaining a running clearance of an electrically actuated aircraft brake comprising a heat pack with carbon friction discs and an electrical actuator with a ram movable, from an adjustable initial position, into engagement with the heat pack so as to apply the brake, the running clearance being the distance between the ram and the heat pack when the brake is not applied, said method for operation during taxiing and between braking operations and including, without applying the brake:
  recording data indicative of the change in thickness of said heat pack with temperature;
  measuring the temperature of the heat pack; and
  adjusting said initial position of the actuator in dependence upon said data and the measured temperature.

* * * * *